United States Patent
Fang et al.

(10) Patent No.: US 8,316,184 B2
(45) Date of Patent: Nov. 20, 2012

(54) DOMAIN-BASED CACHE MANAGEMENT, INCLUDING DOMAIN EVENT BASED PRIORITY DEMOTION

(75) Inventors: Zhen Fang, Portland, OR (US); Erik G Hallnor, Beaverton, OR (US); Nitin B Gupte, Beaverton, OR (US); Steven Zhang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 871 days.

(21) Appl. No.: 12/165,350

(22) Filed: Jun. 30, 2008

(65) Prior Publication Data

US 2009/0327611 A1 Dec. 31, 2009

(51) Int. Cl.
*G06F 13/00* (2006.01)
*G06F 13/28* (2006.01)
*H04N 7/12* (2006.01)

(52) U.S. Cl. . 711/118; 711/158; 711/122; 711/E12.075; 375/240.16; 375/E7.101

(58) Field of Classification Search .................. None
See application file for complete search history.

(56) References Cited

U.S. PATENT DOCUMENTS

2007/0176939 A1* 8/2007 Sadowski ............... 345/557

OTHER PUBLICATIONS

Koohyar Minoo and Truong Nguyen, "Reciprocal Subpixel Motion Estimation: Video Coding With Limited Hardware Resources", Jun. 2007, IEEE Transations on Circuits and Systems for Video Technology, vol. 17, Issue 6, pp. 707-718.*

Hallnor, Erik G., et al., "A Fully Associative Software-Managed Cache Design", *Advanced Computer Architecture Laboratory, Dept. of Electrical Engineering and Computer Science, The University of Michigan*, (2000), 10 pgs.

Hallnor, Erik G., et al., "A Fully Associative Software-Managed Cache Design", http://portal.acm.org/citation.cfm?id=342001. 339660&ump=cit&col..., (2000), 2 pgs.

Hallnor, Erik G., et al., "A Compressed Memory Hierarchy Using an Indirect Index Cache", *Advanced Computer Architecture Laboratory, EECS Department, University of Michigan*, (2004) 14 pgs.

* cited by examiner

*Primary Examiner* — Kevin Verbrugge
*Assistant Examiner* — Eric S Cardwell
(74) *Attorney, Agent, or Firm* — Garrett IP, LLC (57) ABSTRACT

Domain-based cache management methods and systems, including domain event based priority demotion ("EPD"). In EPD, priorities of cached data blocks are demoted upon one or more domain events, such as upon encoding of one or more macroblocks of a video frame. New data blocks may be written over lowest priority cached data blocks. New data blocks may initially be assigned a highest priority. Alternatively, or additionally, one or more new data blocks may initially be assigned one of a plurality of higher priorities based on domain-based information, such as a relative position of a requested data block within a video frame, and/or a relative direction associated with a requested data block. Domain-based cache management may be implemented with one or more other cache management techniques, such as least recently used techniques. Domain-based cache management may be implemented in associative caches, including set associative caches and fully associative caches, and may be implemented with indirect indexing.

20 Claims, 7 Drawing Sheets

DOMAIN-BASED CACHE MANAGEMENT, INCLUDING DOMAIN EVENT BASED PRIORITY DEMOTION

BACKGROUND

Memory caches include partially associative caches and fully associative caches. In set-associative caches, memory is organized into a plurality of sets of N entries, or cachelines, where N is typically between 1 and 8. Each set of cachelines is reserved for a range of addresses or tags. New data is written over previously cached data in a set to which the new address maps. Set associative caches are also referred to as N-way associative caches. In a fully-associative cache, a new block of data can be written over previously cached data in any cacheline.

Cache replacement policies are used to select previously-cached data to be overwritten by new data. Cache replacement policies include least recently used (LRU) and least frequently used (LFU).

Caching is used in video processing, including motion estimation. Motion estimation is an inter-frame predictive coding process to reduce temporal redundancy in video sequences. In motion estimation, a reference video frame is searched for one or more macroblocks of pixels that are similar to a current macroblock of a video frame to be encoded. Similarity tests include a Sum-of-Absolute-Distortions (SAD).

When a similar macroblock is found in the reference frame, the current macroblock is encoded with a pointer and a matrix. The pointer or motion vector indicates a relative coordination between the current macroblock and the reference macroblock. A residual matrix identifies differences between pixels of the current macroblock and reference macroblock. Motion estimation processes include a Three-Step Search, a Four-Step Search, a Diamond Search, and a Modified Log Search.

Relatively high quality video may have 1920×1080 pixels per frame, at 30 frames per second. A macroblock may be as small as 4×4 pixels, and may be encoded with respect to up to sixteen reference macroblocks, within up to eight reference frames. Due to the relatively great amounts of data to be retrieved, cache replacement policies are important in video processing.

BRIEF DESCRIPTION OF THE DRAWINGS/FIGURES

In the drawings, the leftmost digit(s) of a reference number identifies the drawing in which the reference number first appears.

DETAILED DESCRIPTION

Disclosed herein are domain-based cache management methods and systems, including domain event based priority demotion (EPD).

In EPD, priorities of data blocks are demoted upon one or more domain based events and/or conditions. A domain may be a process and/or system for which data blocks are cached. EPD may be implemented alone and/or in combination with one or more other cache priority management techniques, including least recently used (LRU) techniques.

New data blocks may be written over lower priority data blocks.

New data blocks may initially be assigned a highest priority. This is referred to herein as highest priority cache refill.

One or more new data blocks may initially be assigned one of a plurality of higher priorities based on domain-based information. This is referred to herein as domain based priority assignment, or cache refill.

Domain-based cache management methods and systems may be implemented in associative caches, including set associative caches and fully associative caches, and may be implemented with indirect indexing.

Figure 1:
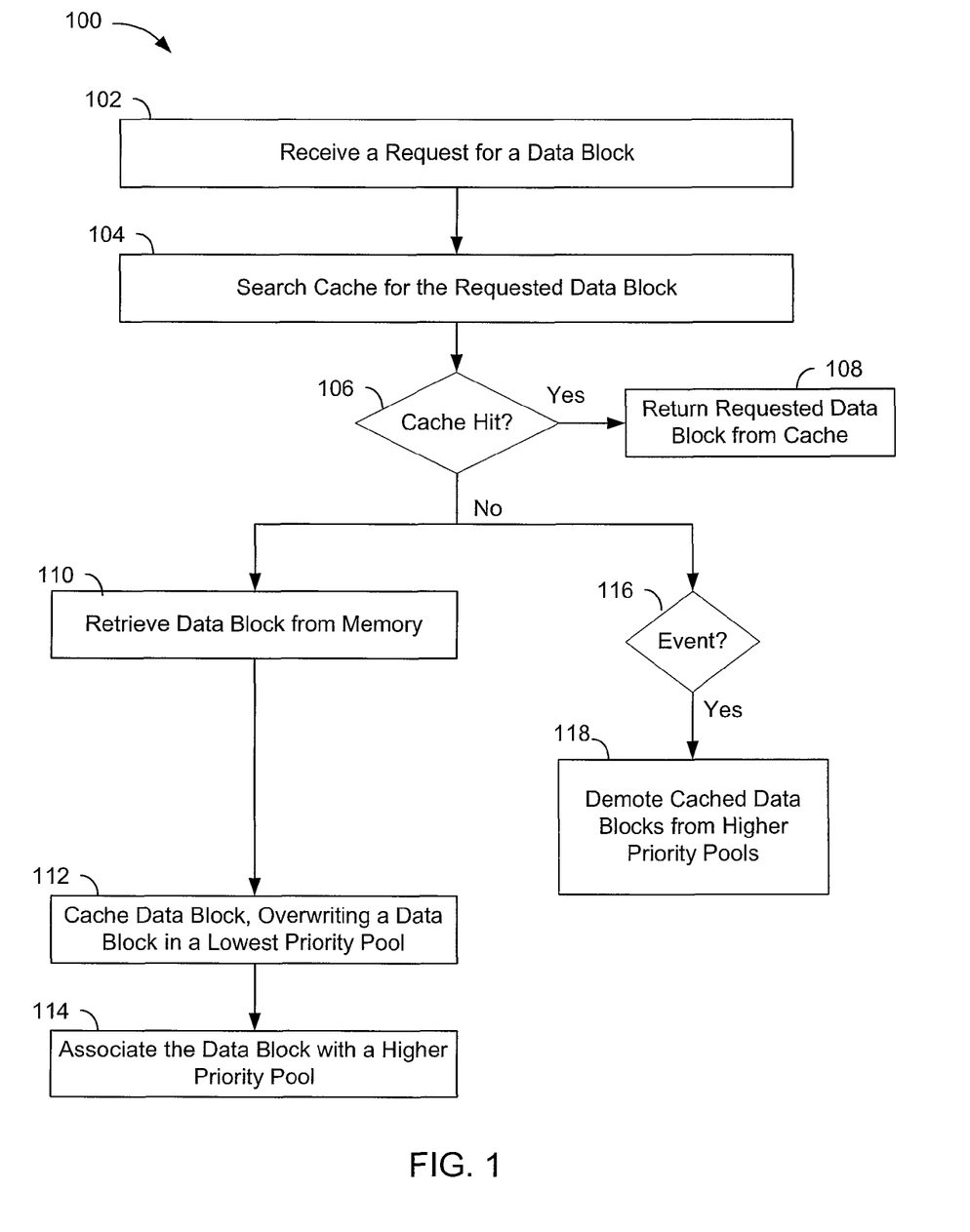
FIG. 1 is a process flowchart illustrating an exemplary method of domain-based cache management, including domain event based priority demotion (EPD).
Figure 2:
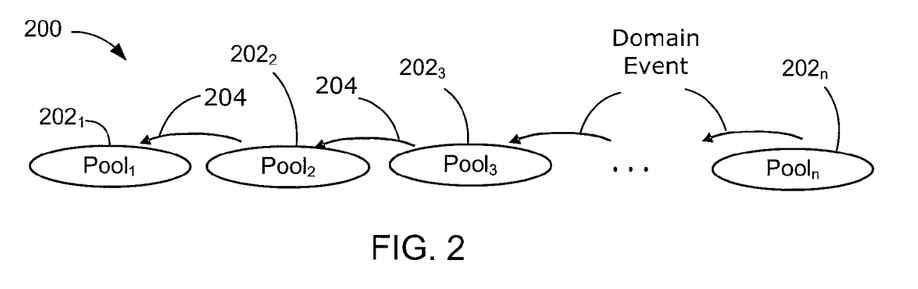
FIG. 2 is a graphical illustration of exemplary prioritized cache pools.

FIG. 1 is a process flowchart illustrating an exemplary method 100 of domain-based cache management, including EPD. Method 100 may be implemented in a cache management system that is configured to prioritize a plurality of pools with respect to one another. FIG. 2 is a graphical illustration of exemplary prioritized pools 200, including a lowest priority pool $202_1$, and higher priority pools $202_2$ through $202_n$, including a highest priority pool $202_n$.

At 102, a request for a data block is received.

At 104, the cache is searched for the requested data block.

Upon a cache hit at 106, the requested data block is returned from cache at 108 to a requesting domain.

Upon a cache miss at 106, the requested data block is retrieved from memory at 110 and returned to the requesting domain.

At 112, the retrieved data block is cached, overwriting a data block in a lowest priority pool, such as pool $202_1$ in FIG. 2.

At 114, the cached data block is associated with a higher priority pool, such as one of pools $202_1$ through $202_n$ in FIG. 2.

Figure 3:
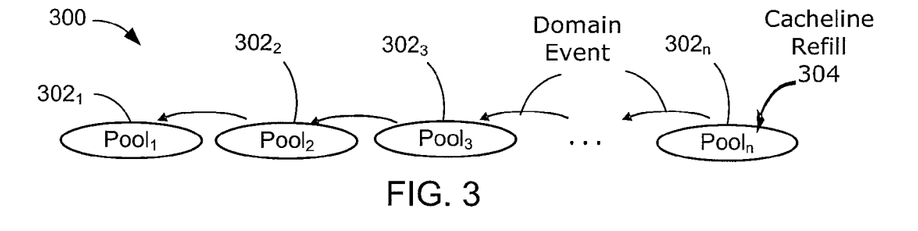
FIG. 3 is another graphical illustration of exemplary prioritized cache pools.

The data block may be associated with a highest priority pool. For example, FIG. 3 is a graphical illustration of exemplary prioritized pools 300, including a lowest priority pool $302_1$, and higher priority pools $302_2$ through $302_n$, including a highest priority pool $302_n$. In the example of FIG. 3, data blocks are initially associated with highest priority pool $302_n$, as illustrated by cacheline refill 304. Exemplary embodiments of highest priority cache refill in a video processing environment are provided below.

Alternatively, the data block may be associated with a pool based on one or more factors that may be indicative of, or predictive of a likelihood of a subsequent request for the data block. A data block that is relatively more likely to be subsequently requested may be associated with a higher priority pool, while a data block that is relatively less likely to be subsequently requested may be associated with a lower priority pool. A determination as to which pool to associate with a data block may be performed with domain information received from a process and/or system external of the cache system.

Figure 4:
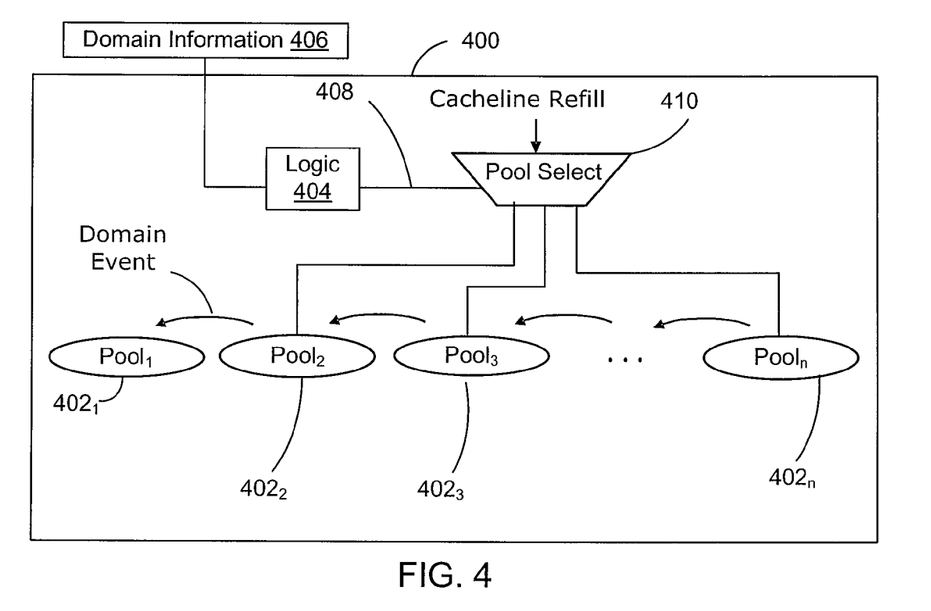
FIG. 4 is a block diagram of an exemplary portion of a cache management system to manage cache pools.

FIG. 4 is a block diagram of an exemplary portion 400 of a cache management system to manage pools $402_2$ through $402_n$. Cache management portion 400 includes logic 404 to receive domain information 406 from, for example, an external process and/or system, and to generate pool select information 408 therefrom. Pool select logic 418 associates a data block with one of pools $402_2$ through $402_n$, in response to pool select information 408. Exemplary domain information 406 and exemplary logic 404 are provided below with reference to the video processing environment.

At 116 in FIG. 1, upon a domain event, cached data blocks that are associated with higher priority pools are demoted to lower priority pools at 118. Data blocks within each pool may be demoted by one priority level, illustrated in FIG. 2 as domain event 204. A domain event may be defined as one or more occurrences of one or more changes or events, which may be external to the cache system, and may be associated with a domain that requested the data block. Occurrence of an domain event may be represented or registered in a register. Exemplary domain events are provided below with reference to a video processing environment.

Determination of a domain event at 116, and/or demotion of data blocks at 118, may be performed while a requested data block is retrieved from memory. For example, where a domain event indication is recorded in a register, the register may be checked at 116 upon a cache miss at 106. Alternatively, demotion may be performed in real-time.

Pools may be implemented and/or managed as first-in, first-out buffers (FIFOs), and demotion may include updating head and tail pointers corresponding to the FIFOs.

Management of priority demotion at 118, cache refill at 112, and priority assignment at 114, may be implemented with logic, such as a controller that implements a state machine, and may be implemented in hardware, software, firmware, and/or combinations thereof. In the example of FIG. 3, pool 300 may be managed with a controller that implements a state machine represented in Table 1.

TABLE 1

| Domain Event Register | Cache Management Routine |
|---|---|
| 1 | Demote all cachelines (data blocks) by one priority. The new data block evicts one cacheline from lowest priority pool and enters highest priority pool. Clear domain event register. |
| 0 | The new data block evicts one cacheline from lowest priority pool and enters highest priority pool. |

Figure 5:
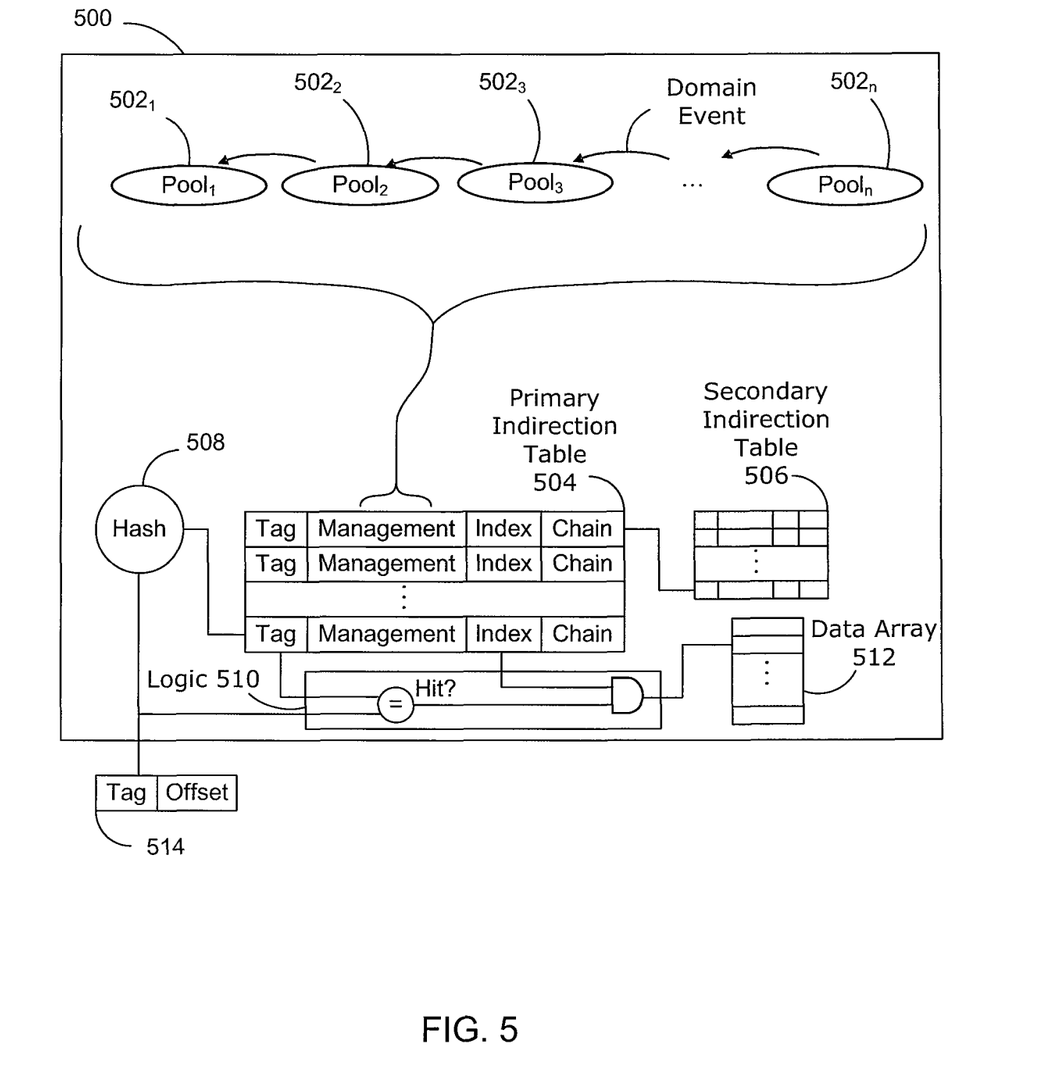
FIG. 5 is a block diagram of an exemplary EPD associative indirect index cache system.

FIG. 5 is a block diagram of an exemplary EPD associative indirect index cache system ("EPD IIC") 500, including a graphical illustration of pools $502_1$, through $502_n$.

EPD IIC 500 includes a cache data array 512 and a cache management portion including an associative primary indirection table 504, a secondary indirection table 506, a hash function 508, and logic 510.

In operation, tag entries are indirectly associated with data blocks in data array 512, through indexes in primary and secondary indirection tables 504 and 506. A block tag 514 is hashed with hash function 508, to locate the tag in primary indirection table 504. Secondary indirection table 506 is configured to resolve hash collisions.

EPD ICC 500 may be fully associative, where a tag entry may indicate any data array location, or partially associative.

The cache management portion of EPD IIC 500 may be configured to demote data blocks of pools $502_2$ through $502_n$, upon domain events, and to write new data blocks over data blocks in lowest priority pool $502_1$, as described above with reference to FIGS. 1 and 2.

The cache management portion of EPD IIC 500 may be configured to associate the new data blocks with higher priority pools $502_2$ through $502_n$, in accordance with highest priority assignment, as described above with respect to FIG. 3, and/or in accordance with domain-based priority assignment, as described above with respect to FIG. 4.

The cache management portion of EPD IIC 500 may be implemented in hardware, software, firmware, and/or combinations thereof. Pools $502_1$ through $502_n$, may be implemented with first-in, first-out ("FIFO") buffers, and may be managed in software. Head and tail pointers for each FIFO may be stored in memory-mapped registers, and may be associated with a management field of primary indirection table 502.

EPD may be implemented in a video processing environment such as, for example and without limitation, motion estimation.

Figure 6:
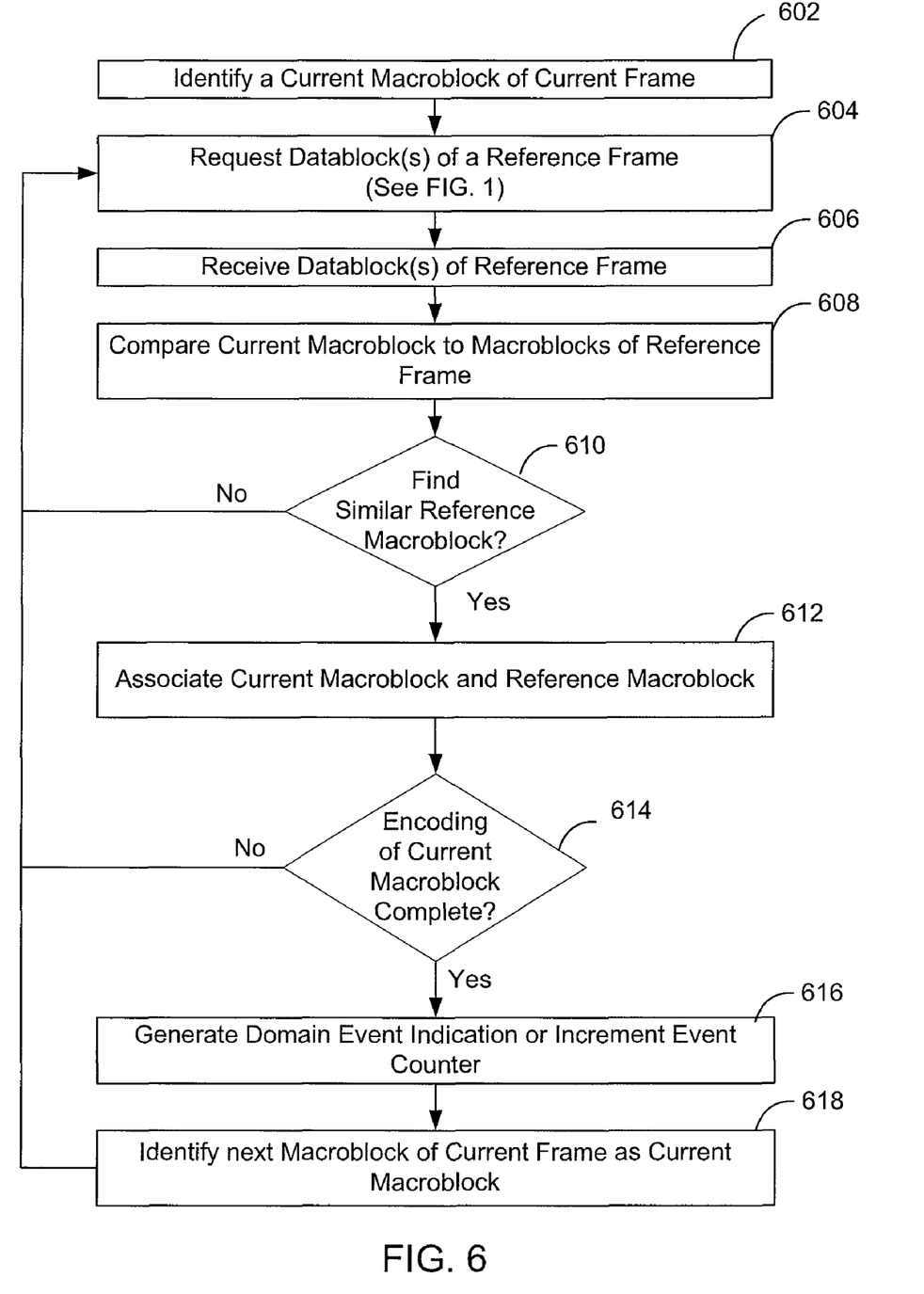
FIG. 6 is a process flowchart of an exemplary method of motion estimation and domain event indicating.

FIG. 6 is a process flowchart of an exemplary method 600 of motion estimation and domain event indicating. Method 600 is described below with reference to FIGS. 7 and 8.

Figure 7:
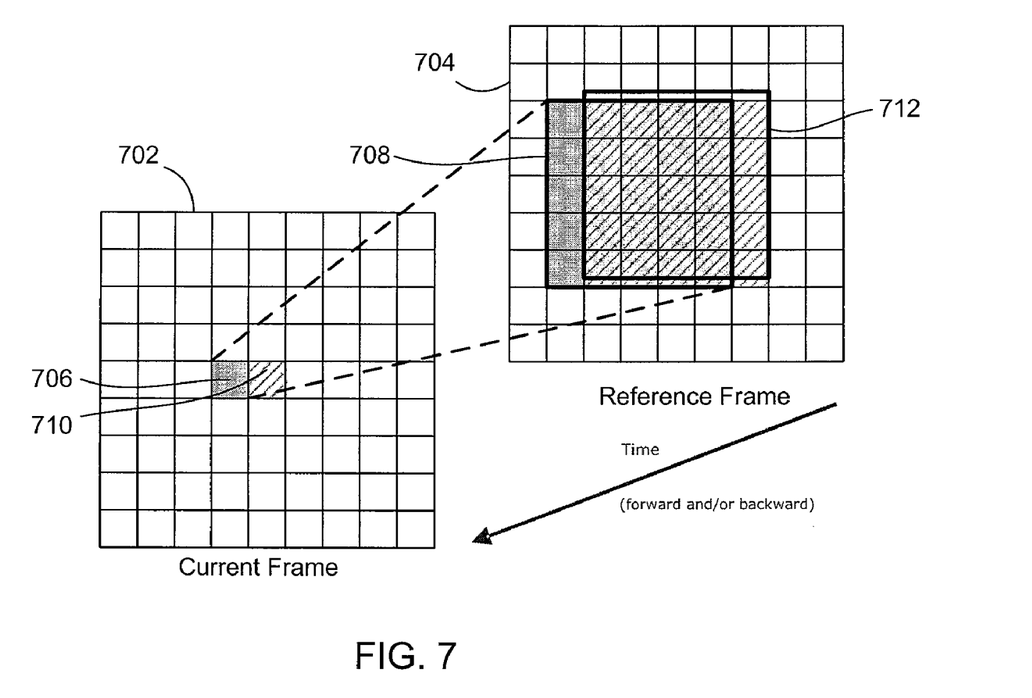
FIG. 7 is a graphical illustration of an exemplary current video frame and an exemplary reference video frame.

FIG. 7 is a graphical illustration of an exemplary current frame 702 and an exemplary reference frame 704. In the example of FIG. 7, macroblocks of current frame 702 are identified with grid lines. Similar grid lines are superimposed over reference frame 704 to illustrate relative positioning between current frame 702 and reference frame 704. Comparisons of a current macroblock to macroblocks of a reference frame, described below with reference to 608, are not, however, restricted by the illustrated grid over reference frame 704.

Figure 8:
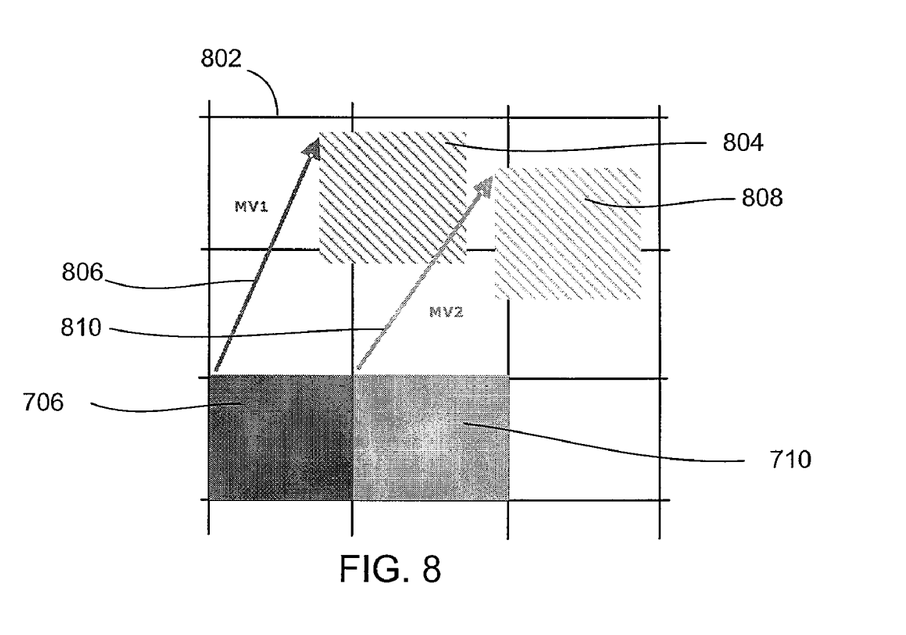
FIG. 8 is a graphical illustration of exemplary motion vectors corresponding to the current frame and the reference frame illustrated in FIG. 7.

FIG. 8 is a graphical illustration of exemplary motion vectors corresponding to current frame 702 and reference frame 704.

In FIG. 6, at 602, a current macroblock of a current frame is identified for encoding, such as a macroblock 706 in FIG. 7. A macroblock may be an array of pixels such as, for example and without limitation, equal to or between a 4×4 array of pixels and a 16×16 array of pixels.

At 604, one or more data blocks of information corresponding to a reference frame, such as reference frame 704 in FIG. 7, are requested. The requested data blocks may correspond to pixels and/or macroblocks of pixels within a window centered about a coordinate of the current macroblock in the current frame, such as a window 708 in FIG. 7. Data block requests at 604 may be processed in as described above with reference to FIG. 1.

At 606, the requested data block(s) are received from cache or memory.

At 608, the requested data block(s) are used to compare one or more reference macroblocks of the reference frame to the current macroblock. Additional data blocks of the reference frame may be requested at 604.

At 610, when a reference macroblock is identified as similar to the current macroblock, the current macroblock is associated with the reference macroblock at 612, such as with a pointer or motion vector.

For example, in FIG. 8, a reference macroblock 804 of reference frame 704 is superimposed over current frame 702, to show a relative position between current macroblock 706 and reference macroblock 804. Where reference macroblock 804 is determined to be similar to current macroblock 706, a pointer or motion vector 806 is generated at 612, to correlate current macroblock 706 to reference macroblock 804.

Motions of macroblocks that are proximate to one another may be similar to one another. For example, in FIG. 7, a macroblock 710 is adjacent to macroblock 706. In FIG. 8, macroblock 710 is illustrated with a motion vector 810 to a reference macroblock 808, which is proximate to reference macroblock 804. Motion vectors 806 and 810 are referred to herein as relatively highly correlated motion vectors.

At 614, in FIG. 6, when the current macroblock is to be encoded with respect to another reference macroblock of reference frame 704 and/or a macroblock of another reference frame, processing returns to 604.

When encoding of the current macroblock is complete, a domain event indication is generated or registered at 616. Alternatively, an domain event counter may be incremented and the domain event indication generated when the counter reaches a threshold. A domain event indicator and/or counter may be implemented in a cache management system or in a domain such as a video processor.

At 618, a next macroblock of the current frame is identified. Processing of macroblocks may be performed in a left to right, or west to east fashion. In FIG. 7, macroblock 710 may identified as the new current macroblock.

Processing returns to 604, where one or more data blocks of information corresponding to the reference frame are requested for the current macroblock. The requested data blocks may correspond to pixels and/or macroblocks of pixels within a window centered about a coordinate of the current macroblock, such as a window 712 in FIG. 7.

As can be seen in FIG. 7, as macroblocks 706 and 710 are encoded in a left-to-right fashion, a corresponding window of potentially relevant pixels in reference frame 704 moves left to right, as illustrated by windows 708 and 712.

As the window moves to the right, pixels in the far right of the window are relatively less likely to have been requested and cached in recent encodings, relative to other pixels in the window. Thus, requests for data blocks corresponding to pixels in the far right are relatively more likely to result in cache misses. Correspondingly, new data blocks tend to be cached more often from the right.

In addition, as the window moves to the right, data blocks associated with pixels towards the left are relatively less likely to be requested for encoding of subsequent macroblocks, while data blocks associated with pixels towards the right are relatively more likely to be requested for encoding of subsequent macroblocks.

Domain-based cache management, including EPD, may be implemented to prioritize data and to demote priorities to accommodate directional processing.

New video data blocks may be initially associated with a pool in accordance with highest priority cache refill, described above with respect to FIG. 3. Under EPD, cached data blocks are progressively demoted to lower priorities as the window moves to the right. Over the course of up to n−1 domain events, a data block is demoted to the lowest priority pool, where it may then be overwritten by a new data block.

Alternatively, or additionally, new video data blocks may be initially associated with a pool in accordance with domain-based priority assignment, as described above with respect to FIG. 4.

Domain-based priority assignment may include a motion vector based priority assignment, in which priority or priority weight may be based on a correlation between a direction of a motion vector of a preceding macroblock, and a direction from a current macroblock to a requested data block. Motion vector based priority assignment may be implemented to take advantage of relatively high correlations between motion vectors of proximate macroblocks.

A direction of a previously generated motion vector may be stored in a register. The register may be updated by a video processor upon a domain event, such as upon encoding of a macroblock. A cache system may check the register upon a cache miss.

Data blocks may be afforded higher priority when the directions are similar, lower priority when the directions are opposite, and mid-level priority when the directions are different but not opposite. For example, nine directions may be represented, including north west, north, north east, west, center, east, south west, south, and south east. The nine directions may be represented by four bits. Other levels of granularity may be implemented.

Figure 9:
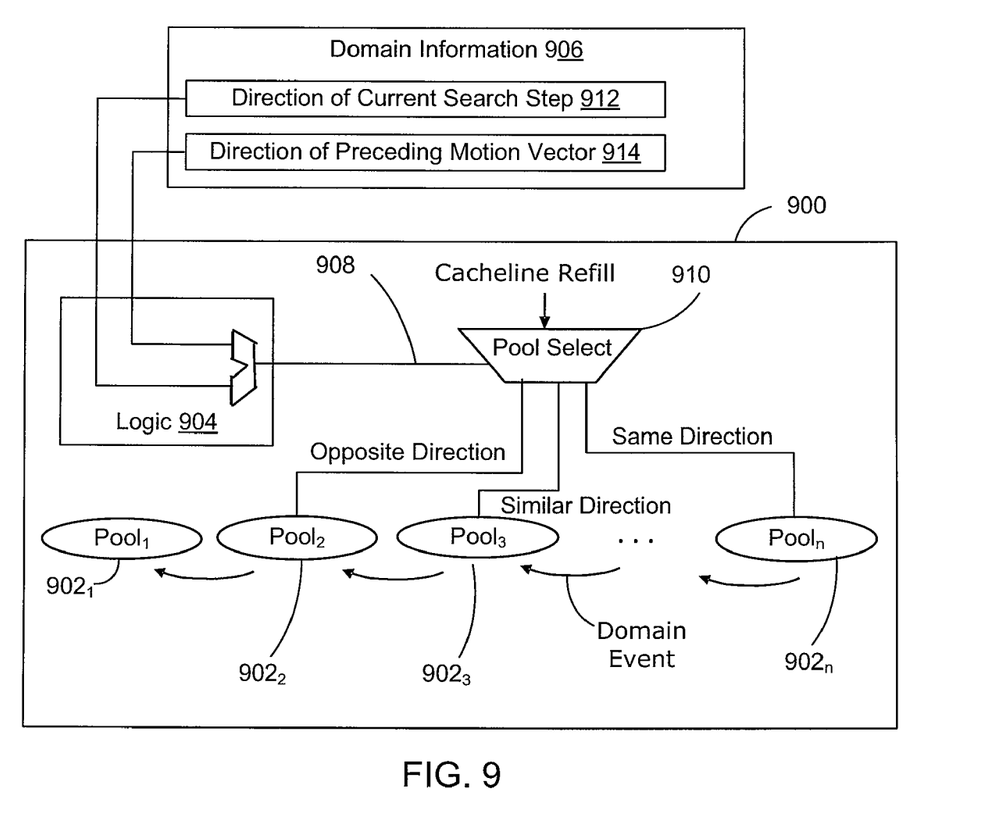
FIG. 9 is a block diagram of an exemplary portion of a cache management system to manage cache pools in accordance with a motion vector based priority assignment.

FIG. 9 is a block diagram of an exemplary portion 900 of a cache management system to manage pools $902_2$ through $902_n$, in accordance with a motion vector based priority assignment. Cache management portion 900 includes logic 904 to compare data 912, indicative of a direction of a current search, with information 914, indicative of a direction of a preceding motion vector. Logic 904 further includes logic to generate an output 908, which may include an indication of one or more of a same direction, a different direction, and an opposite direction. Pool select logic 910 includes logic, which may include multiplexer logic, to associate data blocks with one of pools $402_2$ through $402_n$, in response to comparison result 908.

Figure 10:
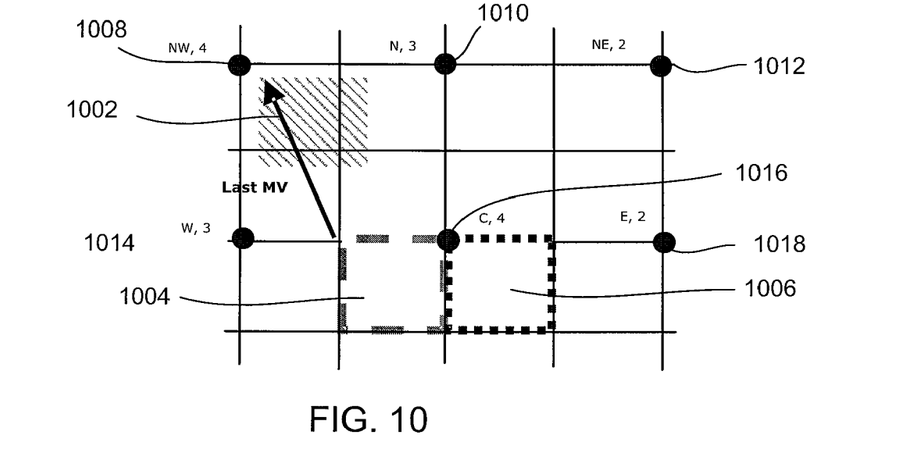
FIG. 10 is a graphical illustration of motion vector based priority assignment.

FIG. 10 is a graphical illustration of motion vector based priority assignment. An exemplary motion vector 1002, corresponding to a previously encoded macroblock 1004 and a reference macroblock 1005, has a substantially north west direction. A motion estimation process, which may be a Three-Step-Search process, may generate nine search points, including search points 1008, 1010, 1012, 1014, 1016, and 1018, for a current macroblock 1006. Based on the north west direction of motion vector 1002, the search points and data blocks proximate thereto, may be afforded priorities in Table 2 below.

TABLE 2

| Point | Direction | Priority |
|-------|-----------|----------|
| 1008 | North West | 4 |
| 1010 | North | 3 |
| 1012 | North East | 2 |
| 1014 | West | 3 |
| 1016 | Center | 4 |
| 1018 | East | 2 |

Where a cache miss is caused by a search point that is north-west of current macroblock 1006, a corresponding requested data block may be assigned to a highest priority pool or weighting, based on a likelihood or probability that one or more subsequent search steps may be performed over a region to which the new data block corresponds.

Domain based priority assignment may include assigning priority or priority weight based upon a distance of a requested data block relative to a coordinate of a current macroblock.

Where processing is performed in a directional fashion, such as west to east, domain based priority assignment may include affording higher priority to data blocks that are east of a current macroblock, relative to data blocks that are west of a current macroblock.

One or more domain based priority assignment features may be implemented alone and/or in various combinations with one another.

Domain-based cache management, including EPD, may be implemented in hardware, software, firmware, and/or combinations thereof, including discrete and integrated circuit logic, application specific integrated circuit (ASIC) logic, and microcontrollers. The term software, as used herein, refers to a computer program product including a computer readable medium having computer program logic stored therein to cause a computer system to perform one or more features and/or combinations of features disclosed herein.

Domain-based cache management, including EPD, may be implemented as part of a domain-specific integrated circuit package, or a combination of integrated circuit packages.

Figure 11:
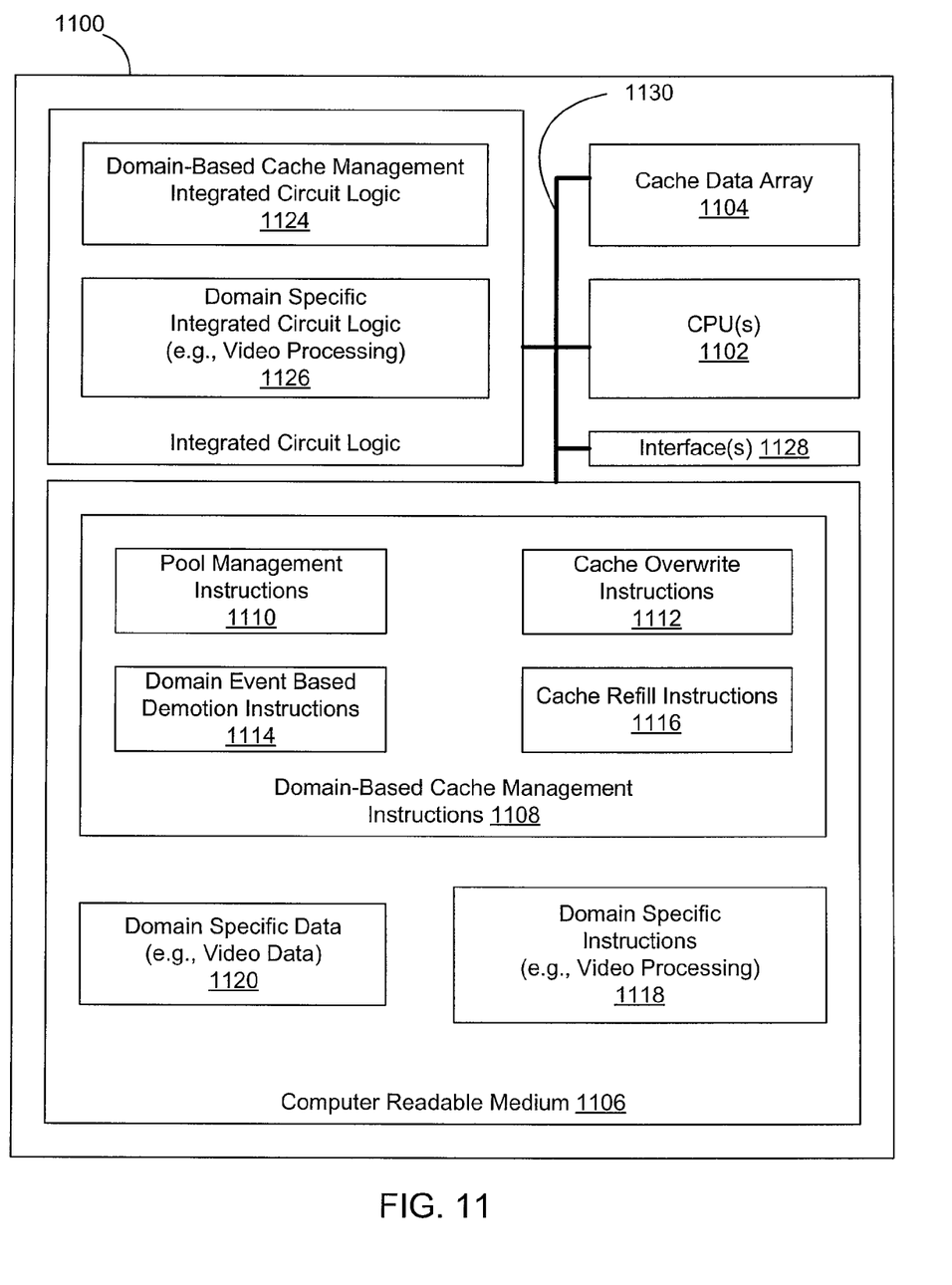
FIG. 11 is a block diagram of an exemplary system to implement a domain environment and domain-based cache management.

FIG. 11 is a block diagram of an exemplary system 1100, to implement a domain environment, such as video processing, and domain-based cache management.

System 1100 includes one or more central processing units (CPUs) 1102 to execute computer program product logic, or instructions. CPU 1102 may include a microcontroller.

System 1100 includes a cache data array 1104, to cache data requested by CPU 1102.

System 1100 includes a computer readable medium 1106 having computer readable instructions stored therein to cause CPU 1102 to perform one or more functions in response thereto.

Medium 1106 includes domain-based cache management instructions 1108 to cause CPU 1102 to implement domain-based cache management with respect to cache data array 1104. Instructions 1108 may include one or more of pool management instructions 1110, cache overwrite instructions 1112, domain event based priority demotion instructions 1114, and cache refill instructions 1116, to cause instruction processor to perform one or more domain-based cache management features described above. System 1100 may include domain-based cache management integrated circuit logic 1124 to support domain-based cache management.

Medium 1106 includes domain-specific data 1120, and domain-specific instructions 1118 to cause CPU 1102 to process domain-specific data 1120. Data 1120 may include video data, and instructions 1118 may include video processing instructions, such as motion estimation instructions. Alternatively, or additionally, system 1100 may include domain-specific integrated circuit logic 1126 to implement or support a domain process.

System 1100 may include a communications infrastructure 1130 to communicate data and/or instructions within system 1100. Communications infrastructure 1130 may include one or more shared data buses and/or dedicated communication links.

System 1100 may include one or more external interfaces 1128 to interface with one or more other devices and/or systems.

System 1100 may be implemented within an integrated circuit package or within a plurality of integrated circuit packages. One or more computer readable media 1106 may be implemented within one or more of such integrated circuit packages, and/or off-chip.

In operation, domain-specific instructions 1118 cause CPU 1102 to request and process domain-specific data 1120. Domain-based cache management instructions 1108 cause CPU 1102 to cache domain-specific data 1120 in cache data array 1104, in accordance with domain-based cache management, as described above.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
associating a plurality of pools with a cache data array, including a lowest priority pool and a plurality of higher priority pools, the plurality of higher priority pools including a highest priority pool;
caching a first data block in the cache data array over a data block in the lowest priority pool, wherein the data blocks correspond to video frame data;
comparing (i) a first direction of a first motion vector pointing from a current block of pixels to the first data block, to (ii) a second direction of a second motion vector of a previously encoded block of pixels that is proximate the current block of pixels, to produce a directional compare result indicating whether the first and second motion vector directions are one of the same, different but not opposite, and opposite;
selectively associating one of a higher priority, a mid-level priority, and a lower priority one of the higher priority pools with the first data block when the compare result indicates the first and second compared directions are similar, different but not opposite, and opposite, respectively; and
demoting data blocks associated with the higher priority pools to correspondingly lower priority pools upon one or more of an event and a condition associated with a completion of encoding of one or more blocks of pixels of a video frame by the video process for which the data blocks are cached.

2. The method of claim 1, wherein the associating includes associating the first data block with the highest priority pool.

3. The method of claim 1, wherein the associating includes selectively associating the first data block with one of the higher priority pools based at least in part on information from the process for which the data blocks are cached.

4. The method of claim 1, wherein the associating includes associating the first data block with the highest priority pool.

5. The method of claim 1, wherein the associating includes selectively associating the first data block with one of the higher priority pools based on a position of the first data block within a reference video frame relative to a position of the current block of pixels within a current video frame.

6. The method of claim 1, wherein the demoting includes demoting upon the one or more of the event and the condition in accordance with least recently used criteria.

7. The method of claim 1, wherein the caching includes associatively caching the first data block and indirectly indexing a tag associated with the cached first data block.

8. A non-transitory computer readable medium having instructions to cause a computer system to:
 associate a plurality of pools with a cache data array, including a lowest priority pool and a plurality of higher priority pools, the plurality of higher priority pools including a highest priority pool;
 cache a first data block in the cache data array over a data block in the lowest priority pool, wherein the data blocks correspond to video frame data;
 compare (i) a first direction of a first motion vector pointing from a current block of pixels to the first data block, to (ii) a second direction of a second motion vector of a previously encoded block of pixels that is proximate the current block of pixels, to produce a directional compare result indicating whether the first and second motion vector directions are one of the same, different but not opposite, and opposite;
 selectively associate one of a higher priority, a mid-level priority, and a lower priority to the first data block when the compare result indicates the first and second compared directions are similar, different but not opposite, and opposite, respectively; and
 demote data blocks associated with the higher priority pools to correspondingly lower priority pools upon one or more of an event and a condition associated with a completion of encoding of one or more blocks of pixels of a video frame by the video process for which the data blocks are cached.

9. The computer readable medium of claim 8, wherein the instructions include instructions to cause the computer system to associate the first data block with the highest priority pool.

10. The computer readable medium of claim 8, wherein the instructions include instructions to cause the computer system to selectively associate the first data block with one of the higher priority pools based at least in part on information from the process for which the data blocks are cached.

11. The computer readable medium of claim 8, wherein the instructions further include instructions to cause the computer system to associate the first data block with the highest priority pool.

12. The computer readable medium of claim 8, wherein the instructions further include instructions to cause the computer system to selectively associate the first data block with one of the higher priority pools based on a position of the first data block within a reference frame relative to a position of the current block of pixels within a current video frame.

13. The computer readable medium of claim 8, wherein the instructions further include instructions to cause the computer system to demote the data blocks upon the one or more of the event and the condition in accordance with a least recently used criteria.

14. The computer readable medium of claim 8, wherein the instructions further include instructions to cause the computer system to associatively cache the first data block and to indirectly index a tag associated with the cached first data block.

15. A system, comprising:
 an instruction processor, including a video processor;
 a cache data array to cache data blocks of pixels of video frames requested by a video process that executes on the instruction processor; and
 a cache management system implemented to,
  associate a plurality of pools with the cache data array, including a lowest priority pool and a plurality of higher priority pools, the plurality of higher priority pools including a highest priority pool;
  cache a first data block in the cache data array over a data block in the lowest priority pool;
  compare (i) a first direction of a first motion vector pointing from a current block of pixels to the first data block, to (ii) a second direction of a second motion vector of a previously encoded block of pixels that is proximate the current block of pixels, to produce a directional compare result indicating whether the first and second motion vector directions are one of the same, different but not opposite, and opposite;
  selectively associate one of a higher priority, a mid-level priority, and a lower priority to the first data block when the compare result indicates the first and second compared directions are similar, different but not opposite, and opposite, respectively; and
  demote data blocks associated with the higher priority pools to correspondingly lower priority pools upon one or more of an event and a condition associated with a completion of encoding of one or more blocks of pixels of a video frame by the video process for which the data blocks are cached.

16. The system of claim 15, wherein the video processor, the cache data array, and the cache management system are implemented within one or more integrated circuit packages.

17. The method of claim 1, further comprising, prior to selectively associating and comparing:
 for the current block, generating search points proximate searchable data blocks near the current block, the search points corresponding to third motion vectors pointing from the current block to the search points; and
 assigning the higher, mid-level, and lower priorities to the search points, and their proximate searchable data blocks, when the third directions are similar, different but not opposite, and opposite to the second direction.

18. The method of claim 17, wherein the first data block is one of the searchable data blocks and the first direction represents one of the third directions.

19. The method of claim 17, wherein the search points represent motion vector directions pointing north west, north, north east, west, center, east, south west, south, and south east of the current block.

20. The computer readable medium of claim 8, wherein the instructions further include instructions to cause the computer system to:
 for the current block, generate search points proximate searchable data blocks near the current block, the search points corresponding to third motion vectors pointing from the current block to the search points; and
 assign the higher, mid-level, and lower priorities to the search points, and their proximate searchable data blocks, when the third directions are similar, different but not opposite, and opposite to the second direction.

* * * * *